W. W. VOSPER.
PIPE THREADING MACHINE.
APPLICATION FILED MAR. 11, 1910.

971,941.

Patented Oct. 4, 1910.
2 SHEETS—SHEET 1.

WITNESSES:
D. C. Walter
E. E. Thomas

INVENTOR.
Wm. W. Vosper,
By Owen & Owen,
His attys

W. W. VOSPER.
PIPE THREADING MACHINE.
APPLICATION FILED MAR. 11, 1910.
971,941.
Patented Oct. 4, 1910.
2 SHEETS—SHEET 2.
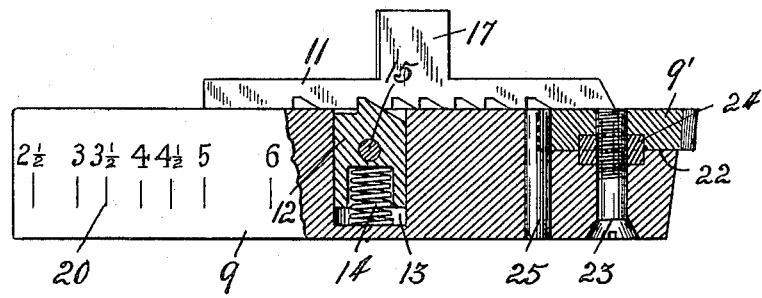
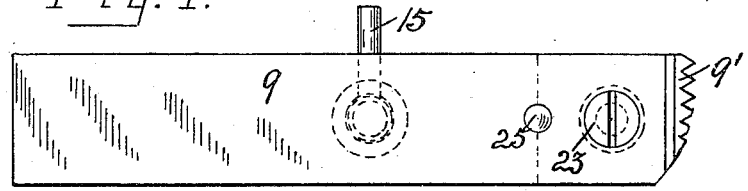
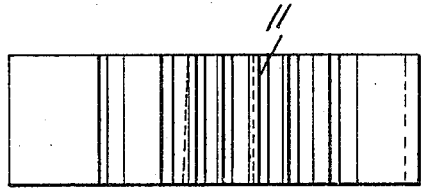
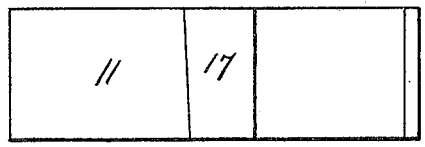
WITNESSES:
D. C. Walter
E. E. Thomas
INVENTOR.
Wm. W. Vosper,
By Owen & Owen,
His attys.

UNITED STATES PATENT OFFICE.

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO.

PIPE-THREADING MACHINE.

971,941. Specification of Letters Patent. Patented Oct. 4, 1910.

Application filed March 11, 1910. Serial No. 548,572.

*To all whom it may concern:*

Be it known that I, WILLIAM W. VOSPER, a citizen of the United States, and a resident of Toledo, in the county of Lucas and State of Ohio, have invented a certain new and useful Pipe-Threading Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to the class of thread cutting machines employed particularly for the cutting of taper threads on metallic pipes or other cylindrical objects and which have a guide part to clamp the work and a head movable relative thereto and carrying a series of dies or chasers for cutting the threads.

The object of my invention is the provision of simple, improved and efficient means for use in association with the dies and the tapered die-actuating members of machines of this class for facilitating an easy, quick and accurate adjustment of the dies relative to the die-head to adapt the same for the threading of articles of various sizes within a predetermined range.

The invention is fully described in the following specification, and a preferred embodiment of the same illustrated in the accompanying drawings, in which,—

Figure 1:
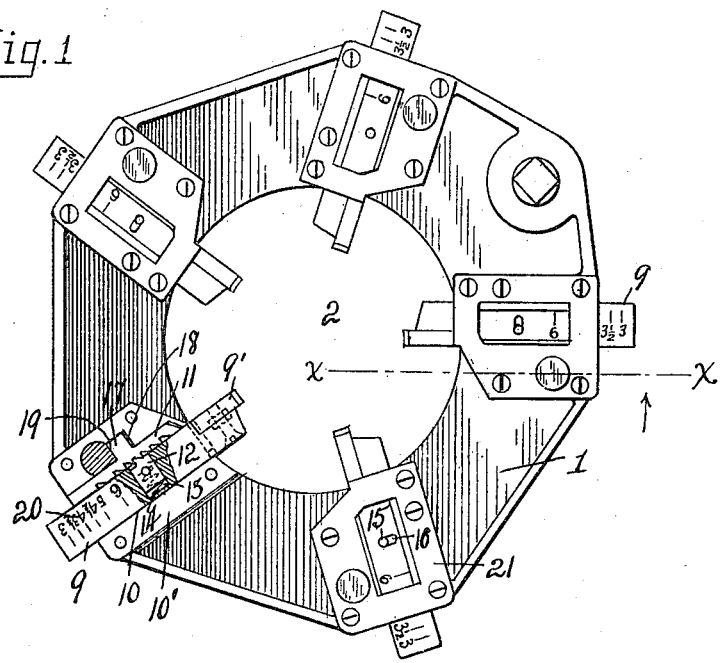
Figure 2:
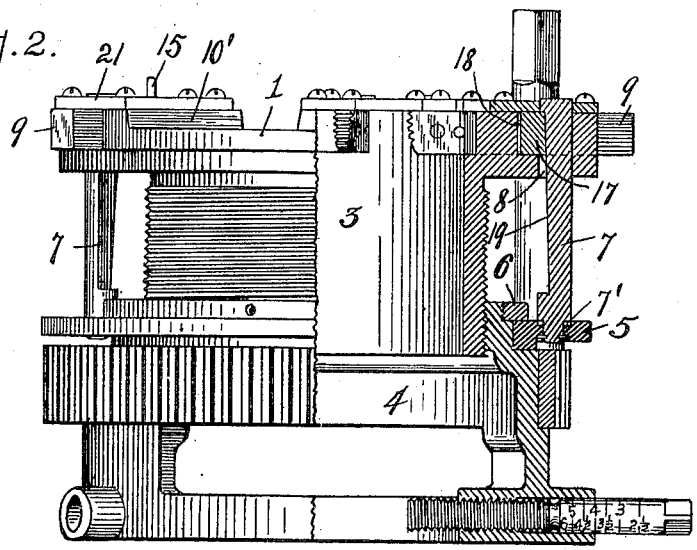

Figure 1 is a face view of a machine embodying my invention with one of the chaser securing plates removed. Fig. 2 is a side elevation thereof with a part in section on the line *x x* in Fig. 1. Fig. 3 is an enlarged plan of a chaser partly in section with the features of my invention associated therewith. Fig. 4 is a side view of the same, and Figs. 5 and 6 are different views of the ratchet-bar of my invention.

Referring to the drawings, 1 designates a chaser carrying head of any suitable form or construction, which has the central circular opening 2, through which the work projects, and has the externally threaded portion 3 to which the usual work-holder 4 threads, as indicated. A collar or ring 5 is mounted for free rotary movements on the holder 4, being held in position thereon by a ring 6 threaded to the holder, and carries a plurality of tapered-faced pins 7, which stand in parallelism with the axis of the head and work through openings 8 in the rim thereof to control the radial movements of the chasers as hereinafter described.

9 designates the chaser-bars or dies which are mounted for radial movements within the recesses 10 provided radially in the bosses or portions 10' on the face of the die-head. The openings 8 through which the tapered pins 7 work are provided in the bosses 10' at one side of the recesses 10 therein. Disposed within each recess 10 at the side of the chaser adjacent the associated pin 7 is a ratchet-bar 11 having teeth on the chaser side thereof with which a pawl 12 carried by the chaser engages. This pawl is mounted within a socket 13 in the chaser side for movements toward and away from the ratchet-bar, and is normally held in engagement with such bar by a spring 14, disposed within the boss of the socket. The pawl and ratchet-bar engage in such manner as to prevent an outward movement of the chaser relative to the bar. To facilitate a release of the pawls from engagement with the bars each is provided with a pin 15, which projects outwardly therefrom through a slot 16 in the top of the chaser.

Projecting from the side of each ratchet-bar which is opposed to its teeth is a lug 17, which works within a recess 18, extending laterally from the associated recess 10 and coacts with the inner longitudinally tapered side 19 of a pin 7, as indicated. As the pins 7 taper from their outer ends inwardly, it is evident that on a screwing of the head 1 into the work-holder 4 the pins 7 will move outwardly through the openings 8 in the head and permit the ratchet-bars 11 and chasers 9 to have gradual outward radial movements to cut a thread on a taper, due to the outward thrust of the lugs 17 against the tapered faces of said pins during a thread cutting operation.

The chasers are graduated, as at 20, to designate the proper adjustments for different sized pipes, and the teeth of the ratchet-bar are spaced to suit such adjustments.

21 designates plates which are secured to the bosses 10' over the chasers and ratchet-bars to retain such parts to their seats within the recesses 10. A portion of each plate is open over the chaser as indicated.

While the chasers 9 may be in a single piece, they are preferably provided with a removable thread cutting portion 9', which is set into a notch or incut 22 in a side of the chaser bar at the inner end thereof. The die portion 9' is held to the chaser-bar by a screw 23, which projects into an opening in the chaser end and threads into the die portion, as shown. The screw 23 also passes through a collar or ring 24, which is disposed between the abutting side of the bar and die portion, fitting partly into complemental recesses provided in each.

The die 9' is positively held against turning relative to the chaser-bar by a pin 25, which is driven into an opening in the bar and engages a recess in the rear end portion of the die. This method of fastening the die portion to the chaser-bar enables the same to be easily and quickly removed and a new one substituted therefor, and at the same time provides a rigid and strong means of securing the die to the bar.

It is thus apparent that I have provided simple and efficient means for facilitating an easy and rapid adjustment of the chasers, and that with my construction and arrangement of the parts a greater range of adjustment for a single machine is permitted than has heretofore been the case, as such adjustment is only limited by the size of the die head opening 2 and the lengths of the chasers and ratchet-bars, and also that I have provided simple, efficient and strong means for securing a separate die or thread cutting portion to a chaser bar.

A further feature of my invention which is found to be important to the practical and satisfactory operation of a machine of this class is the mounting of the tapered pins 7 in their carrying collar 5 in such manner as to permit the pins to have limited longitudinal movements relative to such collar. In the present instance this is permitted by the provision of a play space 7' between the collar abutting shoulder of each pin and the coacting collar surface. With this construction, upon a back-turning of the work-holder 4 after the completion of a thread cutting operation the holder and work are permitted to have a backing-off movement equal to the play space 7' before the pins 7 are moved to effect inward radial or contracting movements of the chasers, thus releasing the dies or chaser ends from the work and permitting a withdrawal of the work from the machine without backturning the same the full length of the thread.

I wish it understood that my invention is not limited to any specific construction or arrangement of the parts, except in so far as such limitations are specified in the claims.

Having thus described my invention, what I claim as new and desire to secure by Letters Patent, is,—

1. In a machine of the class described, the combination with a head having radial chaser-ways therein, and tapered pins movable through the head adjacent such ways, of chasers radially movable in said ways, members mounted in said ways and capable of movements relative to the chasers and having parts coacting with the tapered faces of said pins, and means carried by the chasers and coacting with said members to prevent outward movements of the chasers relative to the members.

2. In a machine of the class described, the combination with a die-head having radial chaser-ways therein, of chasers mounted in such ways, yieldingly movable pawls carried by such chasers, ratchet-members mounted in the ways with said chasers and having a plurality of teeth capable of being selectively engaged by said pawls to prevent an outward movement of the chasers relative to the engaged ratchet-members and a part having tapered portions which work through the head in contact with the ratchet members whereby to permit outward radial movements of such members when the head and part are relatively moved.

3. In a machine of the class described, the combination with a die head having radial chaser-ways therein, and a part having tapered portions movable through the head adjacent such ways when the head and part are relatively moved, of chasers mounted in such ways and having sockets opening toward a side wall of the ways, toothed members yieldingly movable in said sockets, ratchet bars mounted for radial movements within said ways at one side of the chasers and having parts projecting therefrom in engagement with the tapered surfaces of said tapered portions, said bars also having teeth on their inner sides with which said toothed members may be selectively engaged, said toothed members having control parts projecting without the chasers.

4. In a machine of the class described, the combination of the work-holder, and chaser controlling members carried by such holder and capable of limited longitudinal movements relative thereto.

5. In a machine of the class described, the combination of a workholder, and tapered chaser controlling pins attached to such holder for revolving movements around the same, said pins having limited longitudinal play relative to the holder for the purpose described.

In testimony whereof I have hereunto signed my name to this specification in the presence of two subscribing witnesses.

WILLIAM W. VOSPER.

Witnesses:
C. W. OWEN,
E. E. THOMAS.